(No Model.) 6 Sheets—Sheet 1.

W. T. UNGE.
FIREARM OPERATED BY GASES OF EXPLOSION.

No. 515,064. Patented Feb. 20, 1894.

(No Model.) 6 Sheets—Sheet 2.

W. T. UNGE.
FIREARM OPERATED BY GASES OF EXPLOSION.

No. 515,064. Patented Feb. 20, 1894.

(No Model.) 6 Sheets—Sheet 3.

W. T. UNGE.
FIREARM OPERATED BY GASES OF EXPLOSION.

No. 515,064. Patented Feb. 20, 1894.

(No Model.) 6 Sheets—Sheet 4.
W. T. UNGE.
FIREARM OPERATED BY GASES OF EXPLOSION.

No. 515,064. Patented Feb. 20, 1894.

Witnesses:
E. L. Richards

Inventor:
Wilhelm Theodor Unge
By Richards
Attorneys.

(No Model.) 6 Sheets—Sheet 6.

W. T. UNGE.
FIREARM OPERATED BY GASES OF EXPLOSION.

No. 515,064. Patented Feb. 20, 1894.

UNITED STATES PATENT OFFICE.

WILHELM THEODOR UNGE, OF STOCKHOLM, SWEDEN.

FIREARM OPERATED BY GASES OF EXPLOSION.

SPECIFICATION forming part of Letters Patent No. 515,064, dated February 20, 1894.

Application filed October 15, 1890. Serial No. 368,193. (No model.)

*To all whom it may concern:*

Be it known that I, WILHELM THEODOR UNGE, captain, a subject of the King of Sweden and Norway, residing at Valhallavigen, 37, in the city of Stockholm, N., Sweden, have invented certain new and useful Improvements in and Relating to the Automatic Loading and Firing of Guns, of which I declare the following to be a full, clear, and exact description.

This invention relates to an improvement in guns, by which the force of the explosion will be utilized to cause the gun to perform automatically the whole or some parts of the work required for loading and firing. The force utilized may be the air pressure which is generated in the barrel ahead of the projectile as the same passes outwardly thereof or the expanding gas which is left in the barrel after the discharge of the projectile, or part of the gas generated by the explosion and acting behind the projectile may be utilized for the purpose. The compressed air or gas is caused to act upon a piston and the operation of this piston is utilized to compress a spring or an air cushion and the tension thus stored up is then used for releasing the locking mechanism opening the breech mechanism and storing up a supplemental power or tension for subsequently loading the gun closing the breech, locking the breech mechanism and finally firing the arm.

I will hereinafter specifically set forth various ways of carrying out my invention, the above statement serving only to give a general idea of the purpose and action.

I will first describe the invention in connection with a magazine gun.

In the accompanying drawings.

Referring to Figs. 1 to 15, $a$ is the barrel and $b$ the receiver connected thereto and having a bottom $b'$ provided with suitable openings to permit the various parts to act. In the receiver the cylindrical breech bolt $c$ moves and in the rear end of this hollow breech bolt the chambered lock $d$ is arranged to slide back and forth in relation to the breech bolt. This lock $d$ is hollow and in it the shank $h$ of the firing pin $g$ moves, the said pin $g$ extending forward through the breech bolt and pressed normally forward by a spring $f$ within the breech bolt. The firing pin shank has an under cut notch $h'$ which is adapted to be engaged by a sear $i$ pivoted to the breech bolt when the said firing pin is retracted in relation to said bolt. This holds the spring $f$ compressed ready to act when the sear is released from the notch.

Figures 1, 2, 15:
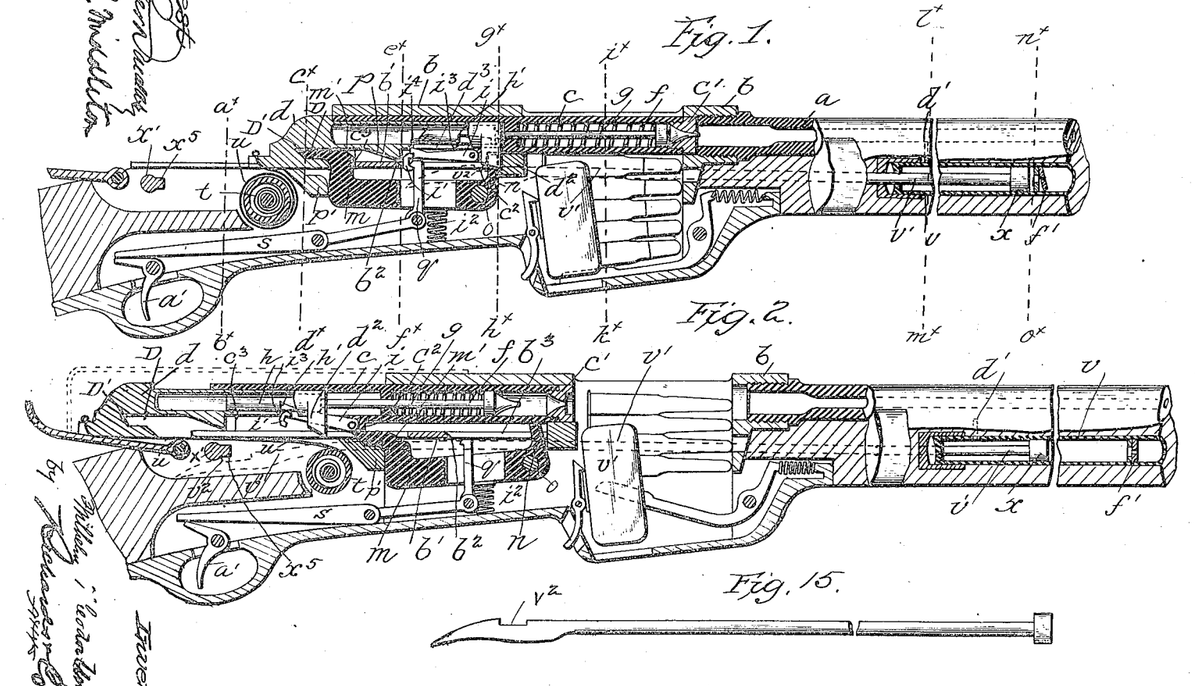
—Figure 1, is a longitudinal section through a magazine gun embodying my invention.
Fig. 2, is a similar view with the parts in a different position.
Fig. 15, is a view of a detail.
Figure 3:
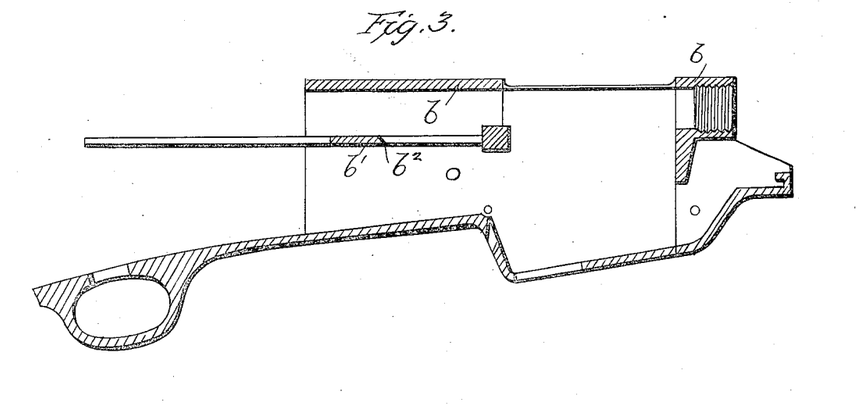
Fig. 3, is a sectional view of the receiver chamber.
Figure 4:
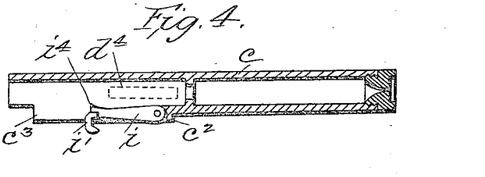
Fig. 4, is a sectional view of the breech bolt.
Figure 5:
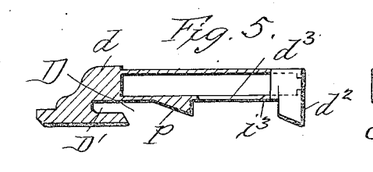
Fig. 5, is a sectional view of the sliding lock bolt.
Figure 6:
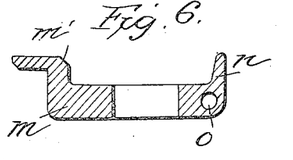
Fig. 6, is a view of the locking lever which acts with the sliding lock bolt to hold the breech bolt.
Figure 7:
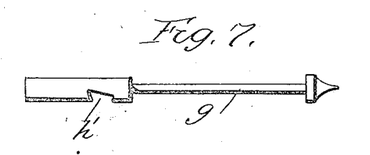
Fig. 7, is a view of the firing pin.
Figures 8, 9, 10, 11, 12:
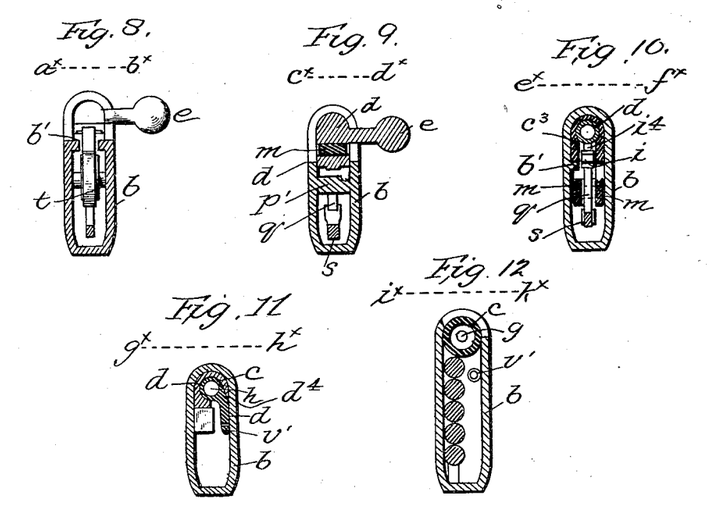
Fig. 8, is a sectional view of Fig. 7 on line $a^x b^x$.
Fig. 9, a section on $c^x d^x$.
Fig. 10, a section on line $e^x f^x$.
Fig. 11, a section on $g^x h^x$.
Fig. 12, a section on $i^x k^x$.
Figure 13:
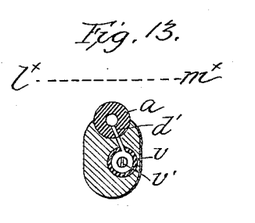
Fig. 13, a section on $l^x m^x$.
Figure 14:
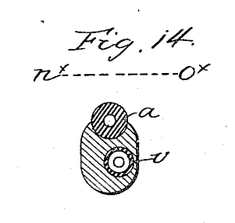
Fig. 14, a section on $n^x o^x$.

The breech bolt is locked in its forward position by the locking lever $m$ which is pivoted in the receiver frame at $o$ and has a rear hooked arm $m'$ which catches back of the shoulder $c^3$ on the breech bolt, and thus holds the same locked in forward position. This locking lever is in turn retained in locking position by means of the locking bolt $d$ which has a recess D with a rearward extension D' to receive the hooked arm of the locking lever and thus hold the same up in locking position.

The lever $m$ bears against the abutment $p'$ and thus sustains the force of the explosion and maintains the breech bolt securely in place. The sear $i$ is provided with a hooked end $i'$ adapted to be engaged by the hook $q$ in order to release the firing pin when the arm is to be discharged. This hook is carried pivotally by a lever $s$ pivoted to the frame and arranged to be operated by the trigger $a'$. The hook and lever are under tension of a spring $i^2$ tending to force the same up.

To the rear end of the lock bolt $d$ a band $u$ is connected and this is wound around a drum $t$ containing a spring. When the breech bolt with the locking bolt is retracted the band is unwound, turning the drum and winding up the spring thus storing up a tension or force tending to impel the lock bolt and breech bolt forward to close the arm and arrange the parts in position for firing.

The rearward movement of the parts is effected immediately after the explosion through the pressure of air or gas generated thereby. In the arrangement shown in Figs. 1 and 2 the gas, acting in rear of the projectile and before said projectile leaves the gun, is utilized as the motive force and as soon as the explosion takes place and the projectile in its passage outward has uncovered the port $d'$ leading from the barrel, the gas flows through said port into the cylinder $v$ carried by the gun under the barrel and acting here upon the piston $x$ forces the same forward compressing the air in front of it and opening the flap valve $f'$ so that the compressed air will be stored up on the other side of said flap valve. This forward movement of the piston not only compresses the air and thus stores up a working force, but it draws forward its piston rod $v'$ which extends back through the gun frame and is provided with a beveled or inclined rear end having a notch $v^2$. When the forward limit of movement has been reached this notch engages the depending lug or shoulder $d^2$ at the forward end of the lock bolt and as soon as the gas pressure forcing the piston forward has become exhausted the air compressed by this forward movement begins to act and the retrograde movement of the piston and its rod begins, the flap valve now being closed and the compressed air flowing through the small perforation therein. The retrograde movement of the piston rod first effects the unlocking of the breech bolt. It forces back the sliding locking bolt at the rear of the breech bolt and the hooked end of the locking lever $m$ is thus freed from the recess D, D' and further than this the incline $p$ on the locking bolt strikes against the inclined corner of the arm $m'$ and forces the rear end of the locking lever downward and away from the shoulder $c^3$ on the breech bolt thus releasing the same. Further than this the locking lever has an arm $n$ at its front end extending up in front of the shoulders $c^2$ on the breech bolt and when the lock lever is rocked on its pivot the arm $n$ strikes the shoulder $c^2$ and gives to the breech bolt an initial rearward movement. The lock bolt continues to move back carrying the firing pin independently of the breech bolt until the depending lug $d^2$ strikes the rear end of the slot $d^4$ in the side of the breech bolt, dotted lines Fig. 4, through which slot the lug projects. When it strikes the end of this slot the breech bolt moves back with the lock bolt which is still retracting under the action of the notched piston rod, the lock bolt has moved back relatively to the breech bolt and these parts now occupy the relative position shown in Fig. 2. During this backward movement of the breech bolt and locking bolt the inclined hook $i'$ of the sear $i$ rides up the incline $b^2$ of the bottom $b'$ of the receiver and thus the end $i^4$ engages the notch $h'$ in the shank of the firing pin so as to retain it with its spring $f$ in rearward position the spring now being contracted.

When the breech bolt is retracted as above described the empty cartridge is extracted and a fresh cartridge placed in proper position to be forced into the barrel when the breech is closed. This may be done by any well known mechanism which I have not thought necessary to show or describe herein.

At the end of the rearward movement the inclined end of the piston rod strikes the cross rod $x'$ and thus it is forced down releasing the lug $d^2$ of the sliding locking bolt from the notch $v^2$ and the coiled spring of the drum $t$ being now free to act starts the lock bolt forward immediately and with it the breech bolt for it will be noticed Fig. 2, that the hooked portion $i'$ of the sear on the breech bolt remains up in engagement with the shoulder $i^3$ on the lock bolt and thus the forward movement of the lock bolt is imparted to the breech bolt through the shoulder $i^3$ and the sear. The sear is held up by contact with the bottom of the receiver. This engagement of the sear with the shoulder $i^3$ continues until the forward movement brings the hooked end of the sear over the incline $b^2$ at the forward end of the receiver bottom $b'$ and the sear under the pressure from the forwardly moving lock bolt exerted through the shoulder $i^3$ now rides down the incline $b^2$ sufficiently far to release the hooked part $i'$ from the shoulder $i^3$ of the lock bolt. At this time the breech bolt is seated and further than this the shoulder $c^2$ has struck the arm $n$ and raised the rear arm of the lock lever to the position of Fig. 1, and immediately after this the lock bolt is released by the fall of the sear and it flies forward within the rear end of the breech bolt to the position shown in Fig. 1. The upper end $i^4$ of the sear however does not fall from engagement with the firing pin shank and this is retained in rearward position while the breech bolt and lock bolt occupy their forward positions as in Fig. 1. The lower part of the lock bolt is slotted at $d^3$, Fig. 5, and this allows the said bolt to fly forward the moment the hooked part $i'$ is removed from the shoulder $i^3$, the upper part $i^4$ of the sear being narrow enough to pass through the slot $d^3$ and remain in engagement with the firing pin shank. All these actions can take place while the pressure is maintained on the trigger $a'$ and the hook $q$ is kept depressed as it is only necessary after the parts have been seated, as in Fig. 1, (the firing pin however being held retracted by the sear) to release the pressure on the trigger when the hook $q$ will rise under the action of the spring $i^2$ and engage the hook $i$ of the seat, after which pressure on the trigger will draw down the sear, release the firing pin and discharge the arm after which the automatic actions above set forth will be performed, the pressure on the trigger may or may not be maintained, the automatic actions taking place in either case. When the next explosion takes place the piston $x$ has of course assumed normal position near the gas opening $d'$.

If the operation of the arm is to be effected entirely by hand the cross bar is turned by any suitable outside connection not shown, and as the lug $x^5$ on the cross bar is thus thrown into engagement with the notch $v^2$ of the piston rod the said rod may be retracted by turning the cross bar and thus the piston $x$ may be made to close the port $d$ against the ingress of gas or air pressure. The band $u$ is also disconnected from the lock bolt. The lock bolt may be operated by the handle $e$ extending laterally therefrom.

Figure 16:
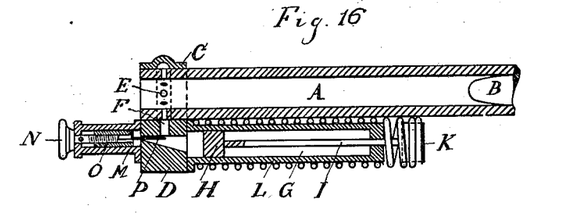
Fig. 16, is a detail sectional view of the end of a gun barrel with the piston cylinder in place and means for regulating the gas or air pressure in the piston cylinder, the piston being arranged to distend a spring and thus store up power.

Referring to Fig. 16, the gun barrel is shown at A, the projectile at B and C is a metallic hoop or band fixed at the muzzle and having a boss D on one side. A channel F extends through this boss connecting with the openings E through the barrel and with the cylinder G carried by the boss. The cylinder contains a piston H, the rod I of which projects through the rear end of the cylinder and has a head K connected to a spring L arranged about the cylinder and having its end fixed thereto. This spring performs the same function as the compressed air in the chamber shown in Fig. 1. The supply of fluid pressure to the piston may be regulated by the cut off piece P arranged to extend over the port of the canal F which piece P is adjusted by the screw N passing through the box M into the cylindrical shank of the cut off piece. In this instance the pressure is derived from the air in front of the projectile which is suddenly compressed when the discharge of the projectile takes place and rushes through the ports E and conduit F into the cylinder thus moving, the piston H Fig. 16 and expanding the spring. The hooked or notched piston rod is not shown, but this may be arranged in an obvious manner. The valve piece P also regulates the escape of the compressed gas or air from the cylinder. Besides the air which is compressed ahead of the projectile the gas which is left in the barrel after the projectile has left it, finds its way into the cylinder as it expands and thus aids the air pressure in operating the piston.

Figure 17:
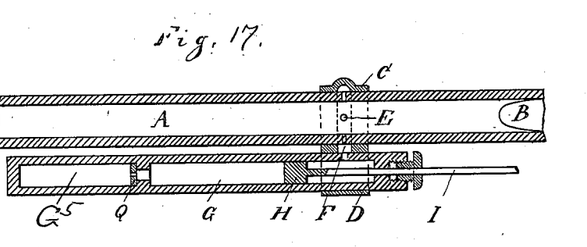
Fig. 17, is a view of a modification in which the piston and its inlet port to the gun barrel is arranged back from the end thereof, this modification showing also a compressed air chamber to take the place of the spring of the previous figure.

In Fig. 17, the ports E and canal F with the cylinder are arranged back from the muzzle so that the piston will be acted upon by the gas generated in rear of the projectile and before the said projectile leaves the barrel. In this figure also a compressed air chamber $G^5$ is used instead of the spring L. A flap valve Q having a smaller perforation being arranged to control the back action of the compressed air on the piston.

Figure 18:
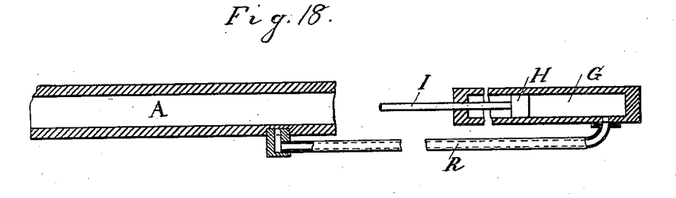
Fig. 18, is a modification showing that the piston cylinder may be located at any desired distance from the gun barrel being connected therewith through any suitable conduit.

Fig. 18 shows the cylinder G arranged at any desired distance from the barrel, it being connected thereto by a conduit R.

Figures 19, 20, 21, 22:
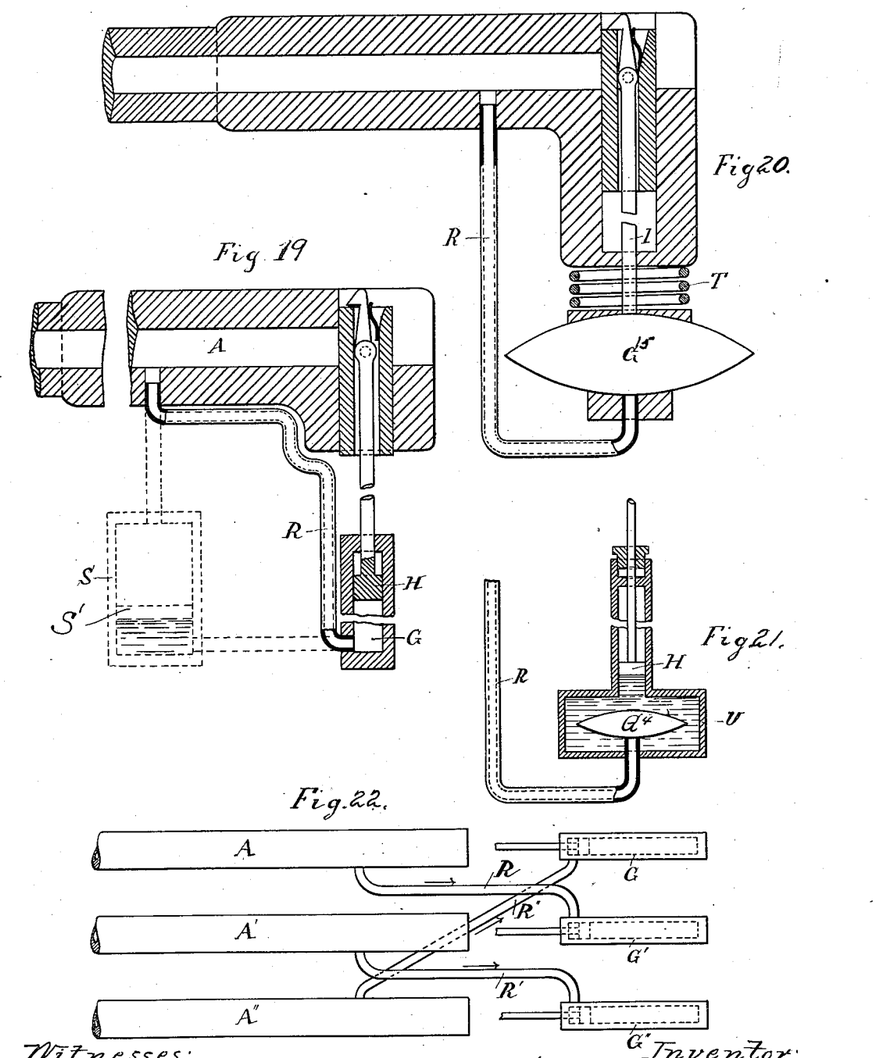
Fig. 19, is a modification.
Figs. 20 and 21 are modifications in which an expansible bulb is used.
Fig. 22, is a modification in which three barrels are used with three different piston chambers the barrels and pistons being connected up into a circuit.

Fig. 19, shows the cylinder arranged at right angles to the barrel, the hooked piston rod acting upon a breech piece movable at right angles to the barrel axis, the conduit for the compressed air being shown at R. This figure also shows in dotted lines a liquid vessel S interposed between the barrel and the piston cylinder. A piston $S'$ may be used in this liquid vessel to receive the gas pressure and to protect the liquid from the gas. Instead of a piston and cylinder I may use an expansible cell into which the gas or air is conducted. Fig. 20 shows such a shell $G^{15}$ connected to the pipe R leading from the barrel. The cell has a rod I connected to one of its expansible walls and this rod is intended to perform the functions described in connection with the piston rod $v'$ of Figs. 1 and 2. The power is stored up in the spring T which is compressed as the cell expands.

Fig. 21, is a modification in which the cell $G^4$ is located within a liquid chamber U and the movement of the liquid in this chamber due to the expansion and contraction of the cell is imparted to a piston H and this operated as before described to work the gun.

In multi-barreled guns each barrel may have its mechanism controlled by a separate cylinder or elastic cell and such an arrangement is shown diagrammatically in Fig. 22. Here however the gas for operating any one cylinder is not taken from the barrel to which the cylinder belongs, but from one of the other barrels.

The gas from the barrel A instead of being led to the corresponding cylinder G is conducted through the pipe R to the cylinder $G'$ of the next barrel $A'$ and this actuates the firing mechanism of the barrel $A'$ and when this is fired the gas passes through the pipe $R'$ to the cylinder $G''$ thus setting the mechanism of the barrel $A''$ the gas from which acts on the piston of the first barrel A in the cylinder G and thus the circuit is completed and said actions may be repeated indefinitely.

Figure 23:
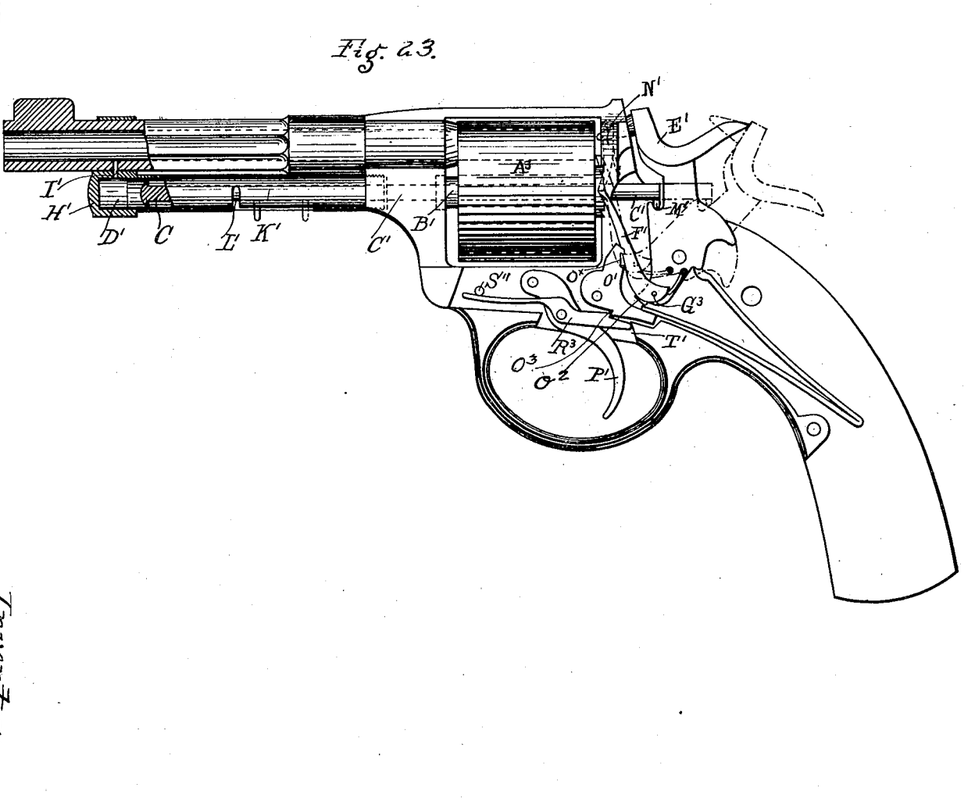
Fig. 23, is a view of the invention as applied to a revolver.

In Fig. 23 the invention is shown as applied to a revolver, $A^3$ is the chambered-piece or cylinder, and $B'$ the trunnion thereof. Through this the piston rod $C'$ moves its forward end having a piston in the cylinder D' communicating with the barrel. The rear end of the rod C' rests against the firing hammer E' which has the pivoted hook F' for rotating the cylinder A³, the pivot being marked G³. The port through the forward end H' of the cylinder is shown at I'. The piston rod has a pin K' moving in a slot in the cylinder which slot has a lateral extension L' by which the piston rod may be locked in forward position with the piston covering the port this being effected by simply turning the piston with its rod so that the pin K' will engage the slot L'. The rear end of the piston rod has a stud M' engaging a notch in the firing hammer, but when the piston rod is rotated and locked by the slot L' this stud leaves the notch and the arm may then be operated by hand. N' is a detent pawl for preventing backward movement of the revolver cylinder.

O' is a pivoted dog provided with a recess O× into which the tooth o² of the hammer engages as shown in dotted lines when the hammer is cocked. The lower part is provided with a tooth o³ engaged by a similar tooth on the arm R³ fixed at the trigger. The arm is prolonged with a spring bearing on the pin S''. The rear end of the arm R³ bears on the incline T' of the frame by which on pulling back the trigger the rear end of the arm is depressed, thus releasing the dog O'. When the arm is fired the gas generated in the barrel forces the piston back and cocks the hammer for the next action.

What I claim is—

1. In combination, the barrel, the firing mechanism, the chamber in the form of an expansible cell communicating with the barrel to receive the air pressure therefrom, and the movable part actuated through the pressure in said expansible cell and connected with the firing mechanism, substantially as described.

2. In combination, the gun barrel, the expansible chamber connected therewith, the compartment filled with liquid and containing said chamber, the firing mechanism, the piston and the cylinder therefor connected to the liquid compartment, said piston being connected with the firing mechanism, substantially as described.

3. In combination, a series of barrels, a series of chambers therefor having movable parts, the firing mechanisms connected to the corresponding movable parts, and the conduit pipes between the gun barrels and the chambers, said conduits connecting each barrel with a chamber belonging to one of the other barrels, substantially as described.

4. In combination, the barrel, the firing mechanism including the breech bolt with its spring drum t and band u, the piston rod v' having a notch adapted to engage a projection d² when the rod is moved forward, the chamber connected with the barrel for receiving the gas therefrom, for forcing the piston rod one way, the spring or air cushion for forcing the piston rod back and the cross bar for releasing the notched end of the piston rod from the projection d², substantially as described.

5. In combination, the sliding breech bolt, the locking bolt sliding in the rear end thereof, the firing pin arranged with its notched shank in the locking bolt, the sear carried by the breech bolt for engaging the said notched shank the receiver bottom b' adapted to hold the sear up engaging the notch and having a shoulder b² to permit the fall of said sear, the lug d² on the sliding locking bolt, the piston rod having a notch engaging the said lug, the means for operating the piston rod, the means for releasing the same from the lug d², the spring for forcing the locking and breech bolt forward and the trigger with the hook connecting with the sear, substantially as described.

6. In combination, the receiver, the firing mechanism, including the breech bolt having shoulders c² c³, the lock bolt arranged to slide in the rear end of the breech bolt and having the cavity D D' and inclined shoulder p, the firing pin carried by the lock bolt, the pivoted locking lever having arms engaging the shoulders c² c³, the notched rod for engaging and operating the lock bolt rearward, the means for releasing the rod from the lock bolt, the means for forcing the lock bolt forward and the means for operating the notched rod, substantially as described.

7. In combination, the breech bolt, the lock bolt sliding in the rear end thereof, and having a lower slot, a recess D D' and a shoulder p, the pivoted locking lever having an arm to engage the recess, the firing pin having a notched shank sliding in the locking breech bolt and having a hook i' and a point i⁴, the former of which is adapted to hold the lock bolt in retracted position relative to the breech bolt and the latter being arranged to hold back the firing pin, the receiver bottom b' having a shoulder b² adapted to permit the fall of the sear and the withdrawal of the hook i' from the lock bolt to release the same and the trigger with means for operating the sear to release the firing pin, substantially as described.

8. In combination the receiver, the firing mechanism including the breech bolt having shoulders c² c³, the lock bolt sliding in the rear end of the breech bolt and having the cavity D D', and inclined shoulder p, the firing pin carried by the lock bolt, the pivoted locking lever having arms to engage the shoulders c² c³ and the means for operating the sliding lock bolt, substantially as described.

9. In combination, the receiver, the breech bolt, the sliding locking bolt at the rear thereof and having recess D D' and shoulder p, the firing pin, the locking lever arranged to engage the breech bolt and the recess D D' of the lock bolt, the means for operating the lock bolt and the abutment p' against which the locking lever bears, substantially as described.

10. In combination, the firing mechanism, the means for operating the same to set the parts for a new action consisting of the chamber the piston rod operated through the pressure therein, and the means for locking said rod against movement whereby the arm may be adapted for hand operation only, substantially as described.

11. In combination, the firing mechanism, the means for operating the same to set the parts for a new action consisting of the gas or air pressure chamber, the piston rod operated through the pressure therein, the said rod having a notch to engage the working parts of the gun and the means for releasing the rod from engagement with said parts and also for locking the rod against action consisting of the rotary cross bar having a stud adapted to engage the notch on the rod substantially as described.

In testimony whereof I have signed my name to this specification in the presence of two subscribing witnesses.

WILHELM THEODOR UNGE.

Witnesses:
NERE A. ELFWING,
ERNST SVANQVIST.